Jan. 4, 1966     J. E. GILBERTSON     3,226,920

LAWNMOWER DEVICE

Filed Jan. 24, 1964

INVENTOR
JOHN E. GILBERTSON
BY
*Dick & Zarley*
ATTORNEYS

United States Patent Office 3,226,920
Patented Jan. 4, 1966

3,226,920
LAWNMOWER DEVICE
John E. Gilbertson, 3209 Douglas Ave.,
Des Moines, Iowa
Filed Jan. 24, 1964, Ser. No. 340,069
4 Claims. (Cl. 56—255)

This application is a continuation-in-part of my original application, Serial No. 321,113 under the filing date of November 4, 1963.

This invention relates to lawnmowers and more particularly to guard attachments for power operated lawnmowers.

Power operated rotary lawnmowers are commonplace today and have been so for some time. A serious hazard exists in the operation of these lawnmowers in that they are very dangerous. A great many accidents occur to operators of these lawnmowers by reason of coming into contact with the rotary cutting blade. This contact between the operator and the cutting blade usually occurs when the toes or foot of the operator passes beneath the cutting blade housing thereby contacting the cutting blade. These accidents usually occur when the lawnmower is being pulled backwardly or when the operator falls down and the lawnmower rolls backwardly towards him. Injuries also occur to the lawnmower operator when the cutting blade strikes an object and throws it backwardly towards the operator. Objects such as wire, rocks, nails, etc. are commonly striking the operator's legs and feet sometimes causing serious injury.

Therefore a principal object of the invention is to provide a guard device which eliminates the possibility of serious accidents.

A still further object of the invention is to provide a guard device which will prevent injury to the lawnmower operator without hindering the operation of the lawnmower.

A still further object of the invention is to provide a guard device which will prevent objects which are thrown by the cutting blade from striking the lawnmower operator.

A still further object of the invention is to provide a guard device which will prevent any portion of the operator's body from extending within the cutting blade housing of a lawnmower.

A still further object of the invention is to provide a guard device which may be rapidly attached or detached from a lawnmower.

A still further object of the invention is to provide a guard device which may be attached to a lawnmower without drilling holes in the lawnmower.

A still further object of the invention is to provide a guard device which is adjustable.

A still further object of the invention is to provide a guard device which is economical of manufacture, durable in use, and refined in appearance.

These and other objects will be apparent to one skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

Figure 1:
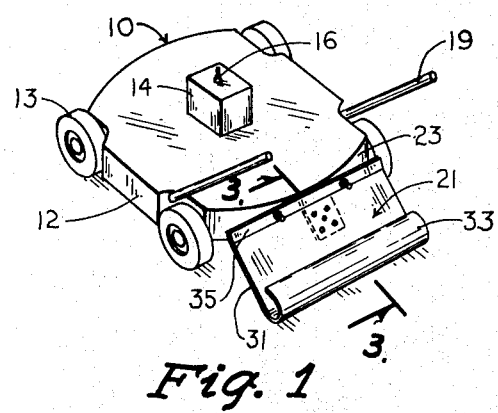
FIG. 1 is a fragmentary perspective view of a lawnmower with a guard attachment secured thereto.

I have used the numeral 10 to generally designate a lawnmower having a cutting blade housing 12 supported by a plurality of wheels 13 rotatably mounted thereon and a power means 14 rigidly mounted on the top surface of housing 12. A spark plug 16 is threadably secured to power means 14. A drive shaft (not shown) extends downwardly from power means 14 and has a cutting blade 17 secured to its lower end. A handle device 18 is secured at its lower end to housing 12.

A guard attachment 21 is hingedly secured to the backward end 23 of housing 12 by means of screw means 25 extending through hinge means 27 and engaging backward end 23 of housing 12. Screw means 25 has a rough or serrated forward end 26. Hinge means 2 is secured to the underside of guard attachment 21 in any convenient manner such as by means of bolts 29.

Guard attachment 21 is comprised of a flat portion 31 which terminates at its rearward end in an arcuate portion 33 and terminates at its forward end in a flange member 35. Flange member 35 extends upwardly and outwardly with respect to guard attachment 21. At least two bolts 37 extend through flange 35 and having nuts 39 threadably embracing bolt 37 on either side of flange 35.

Figure 3:
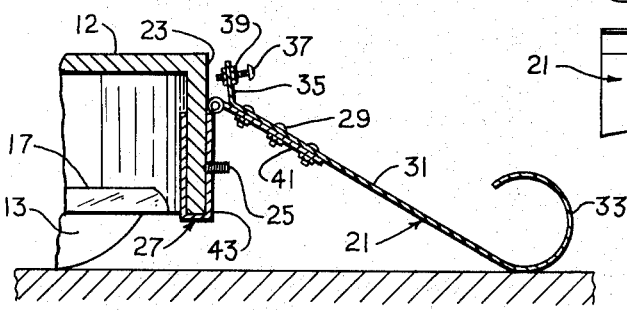
FIG. 3 is a sectional view of the device as seen on line 3—3 of FIG. 1 at an enlarged scale.
Figure 5:
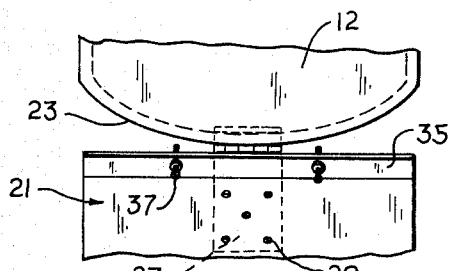
FIG. 5 is a fragmentary top elevational view of the device.
Figure 4:
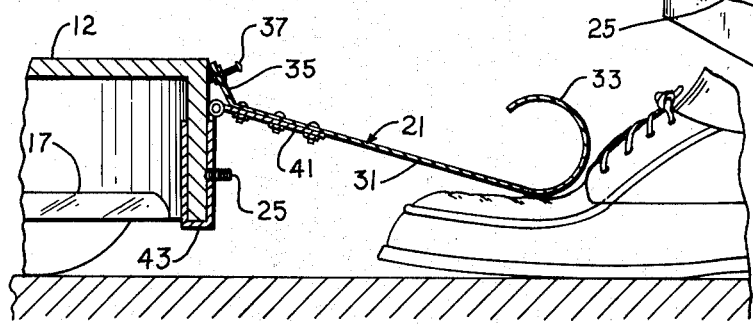
FIG. 4 is a partial side sectional view of the device.
Figure 6:
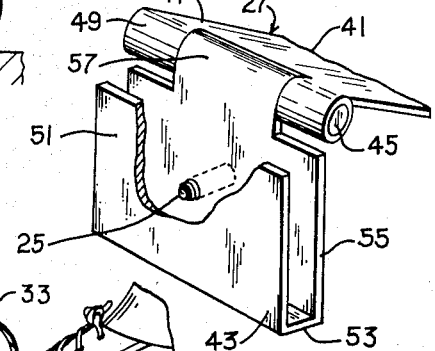
FIG. 6 is a fragmentary perspective view of the hinge means with a portion thereof cut away to more fully illustrate the hinge means.

Hinge means 27 is comprised of hinge members 41 and 43 joined together by means of hinge pin 45. Hinge member 41 is comprised of a flat portion 47 and an arcuate portion 49 extending therefrom. Hinge member 43 is comprised of a first flat portion 51, one end of which terminates in a second flat portion 53 extending at a right angle thereto. Flat portion 53 terminates in a third flat portion 55 extending at a right angle thereto. Flat members 51 and 55 are in a parallel spaced apart relationship. Flat member 55 terminates in an arcuate portion 57 adapted to receive hinge pin 45. FIGS. 3, 4 and 6 illustrate screw means 25 threadably extending through flat portion 55.

The normal method of operation of the device is as follows. The lawnmower 10 will be operated in the ordinary manner. Guard attachment 21 which is hingedly secured to the rearward side of housing 12 will simply slide along the ground. Guard attachment 21 will prevent any objects thrown by the cutting blade from striking the operator. The guard 21 will deflect all such objects into the ground.

Figure 2:
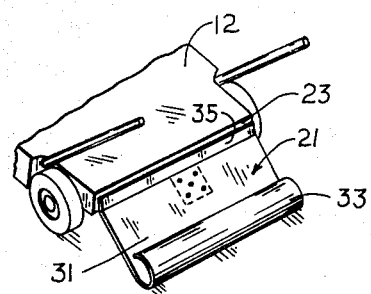
FIG. 2 is a fragmentary perspective view of the device illustrating a modification thereof.

Flange 35 prevents the toes or foot of the operator from passing beneath the housing 12 as illustrated in FIG. 4. The forward end of flange 35 engages the rearward end of housing 12 and limits the upward movement of guard attachment 21. Arcuate portion 33 of guard attachment 21 allows the guard 21 to slide easily along the ground and to permit the lawnmower to be moved backwardly at times without guard attachment 21 digging into the ground. FIG. 4 illustrates flange 35 engaging housing 12 prior to guard attachment 21 reaching a horizontal plane. Flange 35 may be bent to any angle desired to accomplish adjustments in the movement of guard attachment 21. Bolts 37 which extend through flange 35 insures three point contact between guard attachment 21 and a curved rearward end of housing 12 when guard attachment 21 is moved upwardly. If bolts 37 did not engage housing 12 the flange 35 would possibly become bent or twisted. Bolts 37 are not required when housing 12 does not have a curved rearward end, as shown in the modification of FIG. 2 and may be removed or threadably moved outwardly with respect to said housing. The entire upper inside edge of flange 35 will engage housing 12 when the rearward end of housing 12 is not curved as illustrated in FIG. 2. This contact prevents any bending or twisting of flange 35.

The design of the hinge means 27 permits rapid attachment and detachment of the device. Hinge member 43 is simply placed on the rearward end of housing 12 as illustrated in FIGS. 3 and 4 and screw means 25 tightened until the device is secure. The rough or serrated forward end 26 of screw means 25 has a tendency to "dig" into housing 12 thereby insuring a positive engagement therebetween.

Thus from the foregoing it is seen that the invention will accomplish at least all of its stated objectives.

Some changes may be made in the construction and arrangement of my lawnmower device without departing from the real spirit and purpose of my invention, and it is my intention to cover by my claims, any modified forms of structure or use of mechanical equivalents which may be reasonably included within their scope.

I claim:
1. In a lawnmower device,
a lawnmower having a curved rearward housing wall,
a guard attachment hingedly secured to the backward end of said lawnmower,
said guard attachment having a straight flange on its forward end extending upwardly and outwardly with respect to said guard attachment,
said guard attachment having an arcuate portion on its rearward end,
and a stop means adjustably extending through said flange member engaging the curved rearward housing wall of said lawnmower at times.

2. In a lawnmower device,
a lawnmower having a curved rearward housing wall,
a guard attachment hingedly secured to the backward end of said lawnmower,
said guard attachment having a straight flange on its forward end extending upwardly and outwardly with respect to said guard attachment,
said guard attachment having an arcuate portion on its rearward end,
a stop means adjustably extending through said flange member engaging the curved rearward housing wall of said lawnmower at times,
a hinge means for hingedly securing said guard attachment to said lawnmower,
said hinge means comprised of first and second hinge members,
said first hinge member comprised of a flat portion and an arcuate portion extending therefrom,
said second hinge member comprised of a U-shaped member and an arcuate portion extending from the upper portion of one of the side portions of said U-shaped member,
a hinge pin extending through said arcuate portions of said first and second hinge members,
and a screw means threadably extending through one side portion of said U-shaped member.

3. The structure of claim 2 wherein said first hinge member is secured to the forward bottom side of said guard attachment.

4. In a lawnmower device,
a lawnmower having a straight rearward housing wall,
a guard attachment hingedly secured to said rearward housing wall,
said guard attachment having a straight flange means on its forward end extending upwardly and outwardly with respect to said guard attachment; said straight flange means engaging said straight rearward housing wall at times to limit the upward pivotal movement of said guard attachment with respect to rearward housing wall.

References Cited by the Examiner

UNITED STATES PATENTS

| 1,145,521 | 7/1915 | Stock | 16—158 |
| 2,369,480 | 2/1945 | Mills | 16—158 X |
| 2,963,842 | 12/1960 | Estes | 56—25.4 |
| 2,973,613 | 3/1961 | Hagedorn | 56—25.4 |
| 3,040,503 | 6/1962 | Ogle | 56—25.4 |
| 3,106,812 | 10/1963 | McDonagh | 56—25.4 |

ABRAHAM G. STONE, *Primary Examiner.*

RUSSELL R. KINSEY, T. GRAHAM CRAVER,
*Examiners.*